US008219096B2

United States Patent
Wu et al.

(10) Patent No.: US 8,219,096 B2
(45) Date of Patent: Jul. 10, 2012

(54) METHOD AND EQUIPMENT FOR TRANSFERRING INFORMATION OF NEIGHBORING CELL IN WIRELESS COMMUNICATIONS SYSTEM

(75) Inventors: Yong Wu, Shenzhen (CN); Mingxia Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 82 days.

(21) Appl. No.: 12/815,065

(22) Filed: Jun. 14, 2010

(65) Prior Publication Data

US 2010/0261476 A1    Oct. 14, 2010

Related U.S. Application Data

(63) Continuation of application No. PCT/CN2008/073422, filed on Dec. 10, 2008.

(30) Foreign Application Priority Data

Dec. 14, 2007  (CN) .......................... 2007 1 0302137

(51) Int. Cl.
*H04W 88/02* (2009.01)
(52) U.S. Cl. ...................................................... 455/436
(58) Field of Classification Search .............. 455/432.1, 455/433, 522, 452.1, 436–444; 370/252, 370/329, 203, 338, 331
See application file for complete search history.

(56) References Cited

U.S. PATENT DOCUMENTS

| 2004/0137902 | A1 | 7/2004 | Chaskar et al. |
| 2004/0203892 | A1 | 10/2004 | Cole et al. |
| 2007/0265001 | A1 | 11/2007 | Dias et al. |
| 2008/0069028 | A1* | 3/2008 | Richardson ................... 370/328 |
| 2009/0311987 | A1* | 12/2009 | Edge et al. ................. 455/404.1 |
| 2010/0298008 | A1* | 11/2010 | Burroughs ................. 455/456.1 |

FOREIGN PATENT DOCUMENTS

| CN | 1507300 A | 6/2004 |
| CN | 1710986 A | 12/2005 |

OTHER PUBLICATIONS

International Search Report, Application No. PCT/CN2008/073422, Date of mailing Mar. 5, 2009, 4 pages.

* cited by examiner

*Primary Examiner* — Diane Mizrahi
(74) *Attorney, Agent, or Firm* — Slater & Matsil, L.L.P.

(57) ABSTRACT

A method and corresponding equipment for transferring information of a neighboring cell in a wireless communications system are provided. The method includes obtaining position information of a user equipment (UE) when detecting that the UE is in a service connection state. It is determined whether the UE is in a coverage threshold range of a micro-cell adjacent to a current macro-cell according to the position information of the UE. Information of the micro-cell is transferred to the UE when the UE is in the coverage threshold range of the micro-cell adjacent to a current macro-cell.

18 Claims, 3 Drawing Sheets

METHOD AND EQUIPMENT FOR TRANSFERRING INFORMATION OF NEIGHBORING CELL IN WIRELESS COMMUNICATIONS SYSTEM

This application is a continuation of co-pending International Application No. PCT/CN2008/073422, filed Dec. 10, 2008, which designated the United States and was not published in English, and which claims priority to Chinese Application No. 200710302137.2, filed Dec. 14, 2007, both of which applications are incorporated herein by reference.

TECHNICAL FIELD

The present invention relates to the field of wireless communications technologies, and more particularly to a method and equipment for transferring information of a neighboring cell in a wireless communications system.

BACKGROUND

Mobile communications systems are one of the hotspots in research in current communications technologies, and providing indoor coverage is one goal of mobile communications systems. Femto Cell, Pico Cell, and Home NodeB are the latest forms and specific applications of some mobile communications products proposed to solve the indoor coverage problems.

The Femto Cell, the Pico Cell, and the Home NodeB are all mobile communications products with low power, small-scale coverage, and can be referred to collectively as micro-base stations. Their general application scenarios are residential and the offices of middle and small-scale companies, and there are a large number of residences and offices. When a user is outside, the system provides services for the user through signals of a ordinary macro-base station; when the user enters a room or a building, the system provides better services for the user through a micro-base station.

Because of the universality of the services of the mobile communications system, micro-base stations may meet the basic demand of continuous and non-interrupting user service. In other words, roaming and handover capabilities between a common macro-base station and a micro-base station may be provided.

In a mobile communications system including micro-base stations, due to the large number of the micro-base stations, the handover between the micro-base station and the macro-base station becomes more difficult. In particular, when a user enters the coverage of a micro-base station from the coverage of a macro-base station, there may be such problems as how to transfer the information of the micro-base station to the user and enable the user to capture the signals of the micro-base station quickly in an efficient and high-speed way to achieve fast handover, and how to achieve the timely and efficient broadcast of the information of a neighboring micro-base station of the macro-base station in a mobile communications system containing numerous micro-base stations, so as to ensure the smooth handover between the macro-base station and the micro-base station.

In the present mobile communications systems, when a large number of micro-base stations/micro-cells are introduced, because the number of neighboring cells that can be included in the neighboring cell message broadcast to users by the macro-base station is limited, which is generally no more than twenty, and generally no more than 32 at the most, while the neighboring micro-cells of the present cell may be as many as several hundreds altogether, and even more than a thousand. Therefore, it is impossible to broadcast all the neighboring micro-cells of the current cell to the users.

Both of the solutions in the prior art cannot transfer the information of the neighboring micro-cells accurately and in time, and thus a fast and accurate handover cannot be achieved, which tends to result in service interruption or reduction of quality of service.

SUMMARY OF THE INVENTION

Embodiments of the present invention are directed to a method and equipment for transferring information of a neighboring cell in a wireless communications system, which can improve the success ratio of handover of a user between a macro-cell and a micro-cell.

In order to solve the above technical problems, the embodiments provided by the present invention are implemented by the following technical solutions.

In one aspect of a technical solution of the present invention, a method for transferring information of a neighboring cell in a wireless communications system is provided, which includes the following steps.

If it is detected that a UE is in a service connection state, position information of the UE is obtained.

If it is determined that the UE is in a coverage threshold range of a micro-cell adjacent to a current macro-cell according to the position information of the UE, information of the micro-cell is transferred to the UE.

In another aspect of the technical solution of the present invention, a network equipment is provided, which includes a service state detecting unit, a locating unit, a position determining unit, and an information transferring unit.

The service state detecting unit is configured to detect whether a UE is in a service connection state.

The locating unit is configured to obtain position information of the UE.

The position determining unit is configured to determine whether the UE is in a coverage threshold range of a micro-cell adjacent to a current macro-cell according to the position information of the UE, where the position information is obtained by the locating unit.

The information transferring unit is configured to transfer information of the micro-cell adjacent to the current macro-cell to the UE when the UE is in the coverage threshold range of the micro-cell adjacent to the current macro-cell.

In one aspect of the technical solution of the present invention, a method for transferring information of a neighboring cell in a wireless communications system is provided, which includes the following steps.

Whether a UE in a service connection state exists in a macro-cell adjacent to a current micro-cell is detected.

If a UE in a service connection state exists in the neighboring macro-cell, position information of the UE is obtained.

If it is determined that the UE is in a coverage threshold range of the current micro-cell according to the position information of the UE, information of the current micro-cell is transferred to the UE.

In another aspect of the technical solution of the present invention, a network equipment is provided, which includes a detecting unit, a locating unit, a position determining unit, and an information transferring unit.

The detecting unit is configured to detect whether there is a UE in a service connection state in a macro-cell adjacent to a current micro-cell.

The locating unit is configured to obtain position information of a UE in the service connection state when a UE in a service connection state exists in the macro-cell adjacent to the current micro-cell.

The position determining unit is configured to determine whether the UE is in a coverage threshold range of the current micro-cell according to the position information of the UE located by the locating unit.

The information transferring unit is configured to transfer information of the current micro-cell to the UE when the UE is in the coverage threshold range of the current micro-cell.

In another aspect of the technical solution of the present invention, current position of a UE is obtained and current position information of the UE is obtained when it is detected that the UE is in a service connection state, the network side transfers the information of the micro-cell adjacent to the current macro-cell when it is determined that the UE is in the coverage threshold range of the micro-cell adjacent to the current macro-cell. Therefore, the information of the micro-cell which is adjacent to the macro-cell where the UE locates and covers the current position of the UE may be transferred accurately to the UE, accurate instruction given by the network for the handover between the macro-cell and the micro-cell is achieved, thus the success ratio of handover of a UE between the macro-cell and the micro-cell is improved, a fast and efficient handover is ensured, and the quality of service for the user is improved.

In another aspect of the technical solution of the present invention, the current position of a UE is obtained and the current position information of the UE is obtained when it is detected that the UE in a service connection state exists in a neighboring macro-cell, and the information of the current micro-cell is transferred to the UE when it is determined that the UE is in the coverage threshold range of the current micro-cell according to the current position information of the UE. Therefore, the information of the current micro-cell may be transferred to the UE when the UE is in a service connection state and in the coverage threshold range of the current micro-cell, a precise one-to-one selection made by the network in terms of the handover of the UE between the macro-cell and the micro-cell can be achieved, thus a fast and efficient handover is ensured, the success ratio of the handover is improved, and the quality of service for the user is improved. Meanwhile, a precise one-to-one selection made by the network in terms of the handover of the UE between the macro-cell and the micro-cell can be achieved, so the unnecessary interference to other micro-cells and UEs in the network can also be reduced, thus unnecessary resource waste of the user is reduced, and the quality of service for the user is improved.

DETAILED DESCRIPTION OF ILLUSTRATIVE EMBODIMENTS

In the research and practice of the prior art, the inventors found that in practical applications, when a UE moves in a current network, the approach of selecting some of the micro-cells to be broadcast to the UE has a considerable uncertainty. For example, not all these micro-cells are around the UE and a micro-cell that the user is entering or is passing by may even be missed. This may result in that the UE cannot hand over quickly to a right micro-cell, thus service may be interrupted or quality of service may be reduced, and resources and energy of the UE may be wasted as the UE searches for irrelevant neighboring cells.

However, if the UE is enabled to search by itself, the UE needs relatively more resources to search for unknown neighboring cells, so the possibility of successful search is relatively low. For a UE who moves fast, the possibility of searching a neighboring cell is much lower, which easily results in inability to trigger the handover and even results in service interruption.

The embodiments of the present invention provide methods and equipments for transferring information of a neighboring cell in a wireless communications system for improving the success ratio of handover of a UE between a macro-cell and a micro-cell.

A technical solution in an embodiment of the present invention is to locate current position information when detecting that the UE is in a service connection state, determine whether the UE is in a coverage threshold range of a micro-cell adjacent to a current macro-cell according to the current position information, and instruct a network side to transfer the information of the micro-cell adjacent to the current macro-cell when the UE is in the coverage threshold range of the micro-cell adjacent to the current macro-cell.

For better understanding of the objectives, technical solutions, and advantages of the present invention, the present invention is hereinafter described in detail with reference to accompanying drawings and exemplary embodiments.

Figure 1:
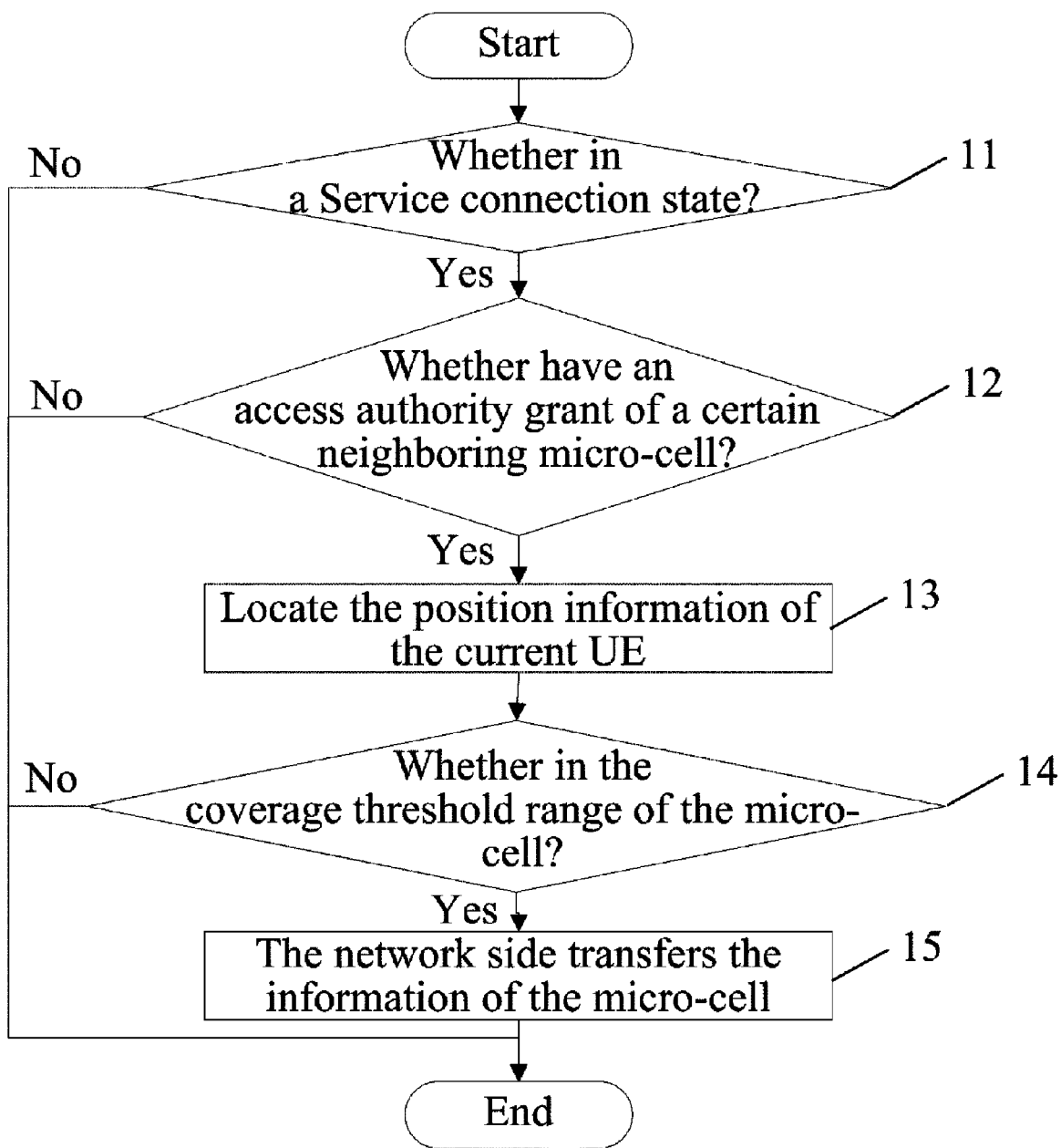
FIG. 1 is a flow chart of a method for transferring information of a neighboring cell in a wireless communications system according to an embodiment of the present invention.

Referring to FIG. 1, a flow chart of an embodiment of a method for transferring information of a neighboring cell in a wireless communications system according to an embodiment of the present invention is shown, and the method is illustrated in detail through the following steps.

In step 11, it is detected whether a user equipment (UE) is in a service connection state; if the UE is in the service connection state, step 12 is performed; and if the UE is not in the service connection state, the process ends.

The detecting whether a UE is in a service connection state may be performed by a network side, or may be performed by the UE itself, or may be performed by a network side after receiving a request message from the UE.

Whether the UE is in the service connection state includes whether the UE is in a service initiating process, or whether the UE is in a service receiving process, or whether the UE is in a calling or session process.

In step 12, optionally, it is detected whether the UE has authorization for accessing a certain micro-cell adjacent to a current macro-cell. If the UE has authorization for accessing a certain micro-cell adjacent to a current macro-cell, step 13 is performed; and if the UE does not have authorization for accessing a certain micro-cell adjacent to a current macro-cell, the process ends.

Because the coverage of a micro-cell is small, and for the sake of privacy, security and accounting, etc, most micro-cells may only allow the UEs having access authorization to access, and do not allow other UEs in the network to access and use the resources of micro-base stations. The network side knows the UE is authorized by which micro-cells, so, in embodiments of the present invention, optionally, it may be detected first whether the UE currently in a service connection state has authorization for accessing a certain micro-cell adjacent to the current macro-cell. The detection may be performed by the network side, or the UE may send a request message to the network side to request the network side to detect whether the UE has authorization for accessing a certain micro-cell adjacent to the current macro-cell. At this point, the network side returns the detection result to the UE as a feedback.

In step 13, the position information of the UE is obtained. The position information of the UE is obtained when the UE is in a service connection state, or, preferably, the position information of the UE is obtained when the UE is in a service connection state and has authorization for accessing a certain micro-cell adjacent to the current macro-cell.

In an embodiment of the present invention, the obtaining the position information of the UE may be obtaining, by the UE itself, the position information of the UE, and may be obtaining, by the network side, the position information of the UE, or obtaining, by the network side in collaboration with the UE, the position information of the UE.

For example, when the UE is equipped with a global positioning system (GPS), the information of the UE may be located by the UE through the GPS.

The information of the UE may also be acquired by employing advanced forward link trilateration (AFLT) technology, and this method may be to be achieved by the network side in collaboration with the UE. Its fundamental principle is as follows. A UE acquires the arriving points of the pilot signals of different cells by measuring the pilot signals of three or more different cells. Thereafter, at the network side, a position decision entity (PDE) calculates the position of the UE employing a suitable position calculating method according to the measurement result of the UE and in combination with the position data of corresponding cells provided by a mobile communications position center (MPC).

It can be understood that other manners may be adopted to locate the current position of a UE, for example, satellite positioning, or network properties intelligent searching and matching positioning. By network properties intelligent searching and matching positioning, a network side records such properties as specific buildings, environment, coverage and channels of each cell and its covered grids, and then performs intelligent searching and matching according to the measured information reported by a UE, thus determining the specific grid where the UE locates.

In step 14, it is determined whether the UE is in the coverage threshold range of the micro-cell adjacent to the current macro-cell. If the UE is in the coverage threshold range of the micro-cell adjacent to the current macro-cell, step 15 is performed; and if the UE is not in the coverage threshold range of the micro-cell adjacent to the current macro-cell, the process ends.

Alternatively, if the UE has authorization or not for accessing a certain micro-cell adjacent to the current macro-cell has been detected in step 12, in this step it is determined whether the UE is in the coverage threshold range of the micro-cell which the UE has authorization for accessing and which is adjacent to the current macro-cell. If the result of detection is yes, step 15 is performed; and if the result of detection is no, the process ends.

Many implementations may be employed to determine whether the UE is in the coverage threshold range of the micro-cell which the UE has authorization for accessing and which is adjacent to the current macro-cell. For example, any one of the following implementations may be employed.

1) It is determined whether a distance between the current position of UE and the micro-cell is smaller than or equal to the coverage distance threshold of the micro-cell. If the distance between the current position of UE and the micro-cell is smaller than or equal to the coverage distance threshold of the micro-cell, it indicates that the UE is in the coverage threshold range of the micro-cell.

2) It is determined whether the fading for the distance between the current position of UE and the micro-cell is smaller than or equal to a maximum link coverage threshold of the micro-cell. If the fading for the distance between the current position of UE and the micro-cell is smaller than or equal to a maximum link coverage threshold of the micro-cell, it indicates that the UE is in the coverage threshold range of the micro-cell.

The network side preserves the information of each macro-cell and micro-cell, including information such as position information and coverage threshold range, different types of micro-cells have different coverage, and whether the current UE is in the coverage threshold range of the micro-cell which the UE has authorization for accessing and which is adjacent to the current macro-cell can be determined by the network side according to the preserved information of the micro-cell and the position information of the UE. Moreover, the UE may send a message to inquire whether the UE itself is in the coverage threshold range of the micro-cell which the UE has authorization for accessing and which is adjacent to the current macro-cell, and the network side may return the result of the inquiry to the UE as a feedback.

In step 15, the network side transfers the information of the micro-cell adjacent to the current macro-cell, or the information of the micro-cell which the UE has authorization for accessing and which is adjacent to the current macro-cell.

The network side performs unified management on various cells, preserves the position and relevant information of each macro-cell and its neighboring micro-cells, and can notify each neighboring cell of the information.

When it is detected that the UE is in the coverage threshold range of the micro-cell which the UE has authorization for accessing and which is adjacent to the current macro-cell, the network side transfers the information of the micro-cell which the UE has authorization for accessing and which is adjacent to the current macro-cell.

The network side adds the information of the micro-cell to a list of neighboring cells, and sends the list of neighboring cells to the UE. Several specific sending modes are provided, for example, defining a dedicated message to be transferred to the UE, sending by broadcast, or a mode that combines unicast with broadcast. The broadcast mode is sending a single message to a group of UEs, and the unicast mode is sending a single message to one UE. When there are simultaneously two or more UEs having access authorization in a service connection state within a micro-cell and in the coverage threshold range of the micro-cell, the information of the micro-cell may be transferred to the UEs through broadcasting. When there is only one UE having access authorization in a service connection state within a micro-cell and in the coverage threshold range of the micro-cell at a certain moment or a relatively short time period, the information of the micro-cell may be transferred to the UE through unicast.

A mode combining event-based sending with periodic sending may also be employed. The event-based sending refers to sending whenever meeting a certain condition, and the periodic sending refers to sending once at regular intervals. There are many modes of combining the event-based sending with the periodic sending. For example, in a mode of "and", send when a preset condition is met, and send when a preset sending period expires, where sending when a preset condition is met and sending when a preset sending period do not conflict with each other. In a mode of "or", within a period of guard time, send when a preset condition is met, and not send when a sending period expires within the period of time; when the period of the guard time passes, send if the sending period expires.

Which sending mode is used may be determined according to the current resource using conditions and the supported modes of the system.

In the embodiments of the present invention, when the UE knows that the UE itself is in the coverage threshold range of the micro-cell which the UE has authorization for accessing and which is adjacent to the current macro-cell, the UE may send a message to instruct the network side and request the network side to transfer the information of the micro-cell which the UE has authorization for accessing and which is adjacent to the current macro-cell. When receiving the notification of the UE, the network side adds the information of the micro-cell which the UE has authorization for accessing and which is adjacent to the current macro-cell to a list of neighboring cells, and sends the list of neighboring cells to the UE.

In embodiments of the present invention, a second coverage threshold range of the micro-cell may be set in advance. For the same micro-cell, the second coverage threshold range of the micro-cell is smaller than the above-mentioned coverage threshold range of the micro-cell. Only when the UE is in the second coverage threshold range of the micro-cell which the UE has authorization for accessing and which is adjacent to the current macro-cell, an operation of sending the updated information of the neighboring cell of the micro-cell to the UE is triggered, so as to ensure that the UE has a better service quality.

After the network side has transferred the information of the micro-cell to the UE, the UE may hand over from the current macro-cell to the micro-cell according to the acquired information of the micro-cell.

In order to further ensure the signal quality of the UE after handover and enhance the user's experience, it is also possible that the UE measures the micro-cell according to the acquired information of the micro-cell, acquires the signal quality of the micro-cell, and performs the operation of handing over the UE from the current macro-cell to the micro-cell only when the signal quality can reach a pre-set signal quality threshold.

It can be seen from this embodiment that current position information is obtained when it is detected that service is in a connection state, and the network side transfers the information of the micro-cell which the UE has authorization for accessing and which is adjacent to the current macro-cell when it is determined that the UE is in the coverage threshold range of the micro-cell adjacent to the current macro-cell. In this way, the information of the micro-cell which the UE has authorization for accessing and which is adjacent to the macro-cell where the UE locates and covers the current position of the UE may be transferred accurately to the UE, and accurate instruction given by the network for the handover between the macro-cell and the micro-cell is achieved. Thus the success ratio of the handover of a UE between the macro-cell and the micro-cell is improved, a fast and efficient handover is ensured, and the quality of service for the UE is improved.

It can be understood that, the determining whether the UE has authorization for accessing a certain neighboring micro-cell may be performed after the determining whether the UE is in the coverage threshold range of a certain neighboring macro-cell.

In embodiments of the present invention, whether the UE has authorization for accessing a micro-cell adjacent to the current macro-cell may further be determined, and the network side sends a list of neighboring cells including the information of the micro-cell to the UE only when the UE has authorization for accessing the micro-cell, this is because the coverage of a micro-cell is small, and for the sake of privacy, security and accounting, most micro-cells may only allow the UEs having access authorization to access, and do not allow other UEs in the network to access and use the micro-base station's resources.

In another technical solution of the present invention, the current position information of a UE is obtained when it is detected that the UE in a service connection state exists in a neighboring macro-cell, and the information of a current micro-cell is transferred to the UE when it is determined that the UE is in the coverage threshold range of the current micro-cell according to the current position information of the UE. In this way, the information of the current micro-cell can be transferred to the UE when the UE is in the coverage threshold range of the current micro-cell.

Figure 2:
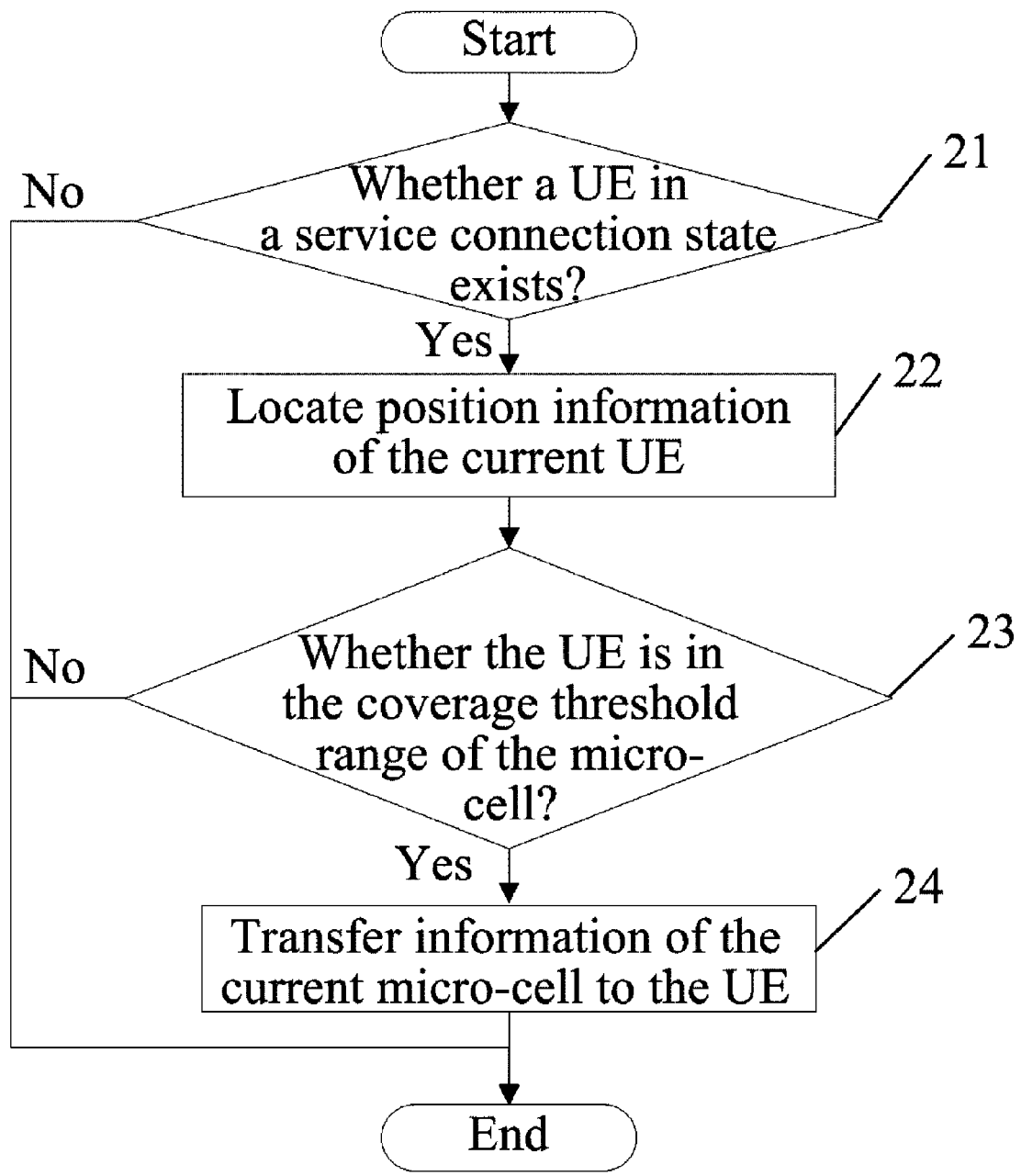
FIG. 2 is a flow chart of another method for transferring information of a neighboring cell in a wireless communications system according to an embodiment of the present invention.

Referring to FIG. 2, a flow chart of another embodiment of a method for transferring information of a neighboring cell in a wireless communications system is shown, and the method is illustrated in detail through the following steps.

In step 21, it is detected whether a UE in a service connection state exists in a macro-cell adjacent to a current micro-cell; if a UE in a service connection state exists in a macro-cell adjacent to a current micro-cell, step 22 is performed; and if no UE in a service connection state exists in a macro-cell adjacent to a current micro-cell, the process ends.

Preferably, in this step, the UE in a service connection state in the macro-cell adjacent to the current micro-cell may also be detected whether the UE has authorization for accessing the current micro-cell.

Because the coverage of a micro-cell is small, and in consideration of privacy, security and accounting, most micro-cells may only allow the UEs having access authorization to access, and do not allow other UEs in the network to access and use the cell's resources. The current micro-cell may detect whether the UE in a service connection state in the neighboring micro-cell has authorization for accessing the micro-cell. If the UE in a service connection state in the neighboring micro-cell does not have authorization for accessing the micro-cell, it is unnecessary to consider the issue that the UE hands over from the current macro-cell to the micro-cell.

Since the network side preserves the information of each macro-cell and each micro-cell, the network side may also detect whether the UE has authorization for accessing a certain micro-cell according to the preserved information when the network side detects that the UE is in a service connection state.

In step 22, the current position information of the UE is obtained. In specific implementations, there are a number of locating modes which can be selected according to current resources and supported modes. For example, when the UE supports GPS, the UE may be instructed by a network side to locate. The current position information of the UE may also be acquired by employing AFLT technology, and the fundamental principle of the technology is as follows. A UE measures the pilot signals of three or more different cells, and acquires the arriving time points of the pilot signals of different cells. Thereafter, at the network side, a PDE calculates the current position of the UE employing a suitable position calculating method according to the measurement result of the UE and in combination with the position data of corresponding cells provided by an MPE. Of course, other locating methods such as satellite positioning or network properties intelligent searching and matching may also be employed.

In step 23, it is determined whether the UE is in the coverage threshold range of the current micro-cell according to the located current position information of the UE. If the UE is in the coverage threshold range of the current micro-cell, step 24 is performed, and if UE is not in the coverage threshold range of the current micro-cell, the process ends.

Many determining methods may be adopted to determine whether the UE is in the coverage threshold range of the current micro-cell, which are illustrated in the following.

1) It is determined whether a distance between the current position of UE and the current micro-cell is smaller than or equal to the coverage distance threshold of the current micro-cell. If a distance between the current position of UE and the current micro-cell is smaller than or equal to the coverage distance threshold of the current micro-cell, it indicates that the UE is in the coverage threshold range of the current micro-cell and is close enough to the current micro-cell.

2) It is determined whether the fading for the distance between the current position of UE and the current micro-cell is smaller than or equal to a maximum link coverage threshold of the micro-cell. If the distance between the current position of UE and the current micro-cell is smaller than or equal to a maximum link coverage threshold of the micro-cell, it indicates that the UE is in the coverage threshold range of the current micro-cell and is close enough to the current micro-cell.

In step 24, the information of the current micro-cell is transferred to the UE. The network side adds the information of the current micro-cell to a list of neighboring cells, and sends the information of the micro-cell to the UE. There may be several specific sending modes, for example, defining a dedicated message to be transferred to the UE, sending by broadcast, or a mode of combining unicast with broadcast, or a mode of combining event-based sending with periodic sending. Which sending mode is used may be determined according to the current resource using conditions and the supported modes of the system.

If the current position of the UE is still relatively far away from the micro-cell, trigger the operation of transferring the updated information of the neighboring cell of the current micro-cell to the UE may temporarily not be triggered. For example, a second coverage threshold range of the micro-cell may be set, and the operation of sending the updated information of the neighboring cell of the current micro-cell to the UE is triggered, only when the current position of the UE is in the second coverage threshold range of the current micro-cell.

After the network side has transferred the information of the micro-cell to the UE, the UE may hand over from the current macro-cell to the micro-cell according to the acquired information of the micro-cell.

Preferably, in order to further ensure the signal quality of the UE after handover and enhance the user's experience, the following steps may also be performed. Instructing the UE to measure the current micro-cell according to the acquired information of the current micro-cell, so as to acquire the signal quality of the current micro-cell, and performing the operation of handing over the UE from the current macro-cell to the current micro-cell when the signal quality can reach a pre-set signal quality threshold.

It can be seen that, in this embodiment, the current position information of a UE is obtained when it is detected that a UE in a service connection state exists in a neighboring macro-cell, and the information of the current micro-cell is transferred to the UE when it is determined that the UE is in the coverage threshold range of the current micro-cell according to the current position information of the UE. In this way, the information of the current micro-cell may be transferred to the UE when the UE is in a service connection state and in the coverage threshold range of the current micro-cell, and a precise one-to-one selection made by the network in terms of the handover of the UE between the macro-cell and the micro-cell can be achieved. Thus a fast and efficient handover is ensured, the success ratio of the handover is improved, and the quality of service for the UE is improved. Meanwhile, a precise one-to-one selection made by the network in terms of the handover of the UE between the macro-cell and the micro-cell can be achieved, so the unnecessary interference to other micro-cells and UEs in the network can also be reduced, thus unnecessary resource waste of the UE is reduced, and the quality of service for the user is improved.

It can be understood that the determining whether the UE has authorization for accessing the current micro-cell may be performed after the determining whether the UE is in the coverage threshold range of the current macro-cell.

In embodiments of the present invention, it may be further determined whether the UE authorization for accessing the current micro-cell, and a list of neighboring cells including the information of the current micro-cell is sent to the UE when the UE has authorization for accessing the micro-cell. This is because the coverage of a micro-cell is small, and for the sake of privacy, security and accounting, most micro-cells may only allow the UEs having access authorization to access, and does not allow other UEs in the network to access and use the micro-cell's resources.

Methods for transferring information of a neighboring cell in a wireless communications system are described above in detail in the embodiments of the present invention. In order to facilitate those skilled in the art to better understand and implement the embodiments of the present invention, another aspect of the embodiment of the present invention is introduced below in detail through an equipment adopted by the embodiment of the present invention.

Figure 3:
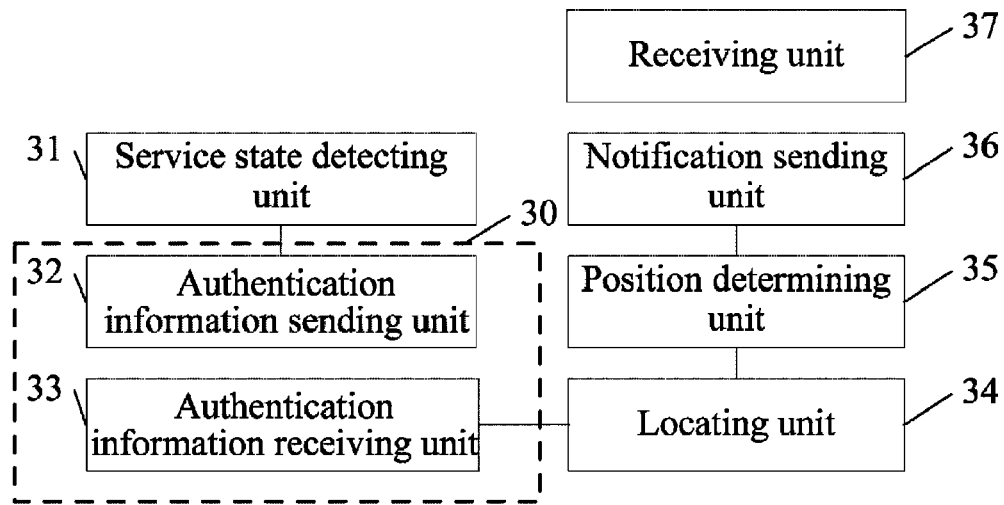
FIG. 3 is a schematic structural view of a UE according to an embodiment of the present invention.

Referring to FIG. 3, a schematic structural view of an embodiment of a UE according to an embodiment of the present invention is shown. The UE includes a service state detecting unit 31, a locating unit 34, a position determining unit 35, a notification sending unit 36, and a receiving unit 37.

The service state detecting unit 31 is configured to detect whether the UE itself is in a service connection state.

The locating unit 34 is configured to obtain position information of the UE itself.

The obtaining, by the locating unit 34, the current position information may be implemented in many ways. For example, when the UE supports GPS, the UE may perform location itself. The AFLT technology may also be employed to acquire the current position information of the UE, and the fundamental principle of AFLT technology is as follows. A UE measures the pilot signals of three or more different cells, and acquires the arriving time points of the pilot signals of different cells. Thereafter, at the network side, a PDE calculates the current position of the UE employing a suitable position calculating method according to the measurement result of the UE and in combination with the position data of corresponding cells provided by an MPE. Of course, other locating methods such as satellite positioning or network properties intelligent searching and matching may also be employed.

The position determining unit 35 is configured to determine whether the UE itself is in a coverage threshold range of a micro-cell adjacent to a current macro-cell according to the position information of the UE itself obtained by the locating unit 34, and trigger the notification sending unit 36 when the UE itself is in the coverage threshold range of the micro-cell adjacent to the current macro-cell.

The determining, by the position determining unit 35, whether the UE is in the coverage threshold range of the micro-cell adjacent to the current macro-cell according to the current position information obtained by the locating unit 34 may be specifically implemented by determining whether the distance between the current position of the UE and the micro-cell is smaller than or equal to a pre-set coverage distance threshold of the micro-cell, or may be implemented by determining whether the fading for the distance between the current position of the UE and the micro-cell is smaller than or equal to a maximum link coverage threshold of the micro-cell.

The notification sending unit 36 is configured to send a message to the network side to request the network side to transfer the information of the micro-cell adjacent to the current macro-cell.

The receiving unit 37 is configured to receive the information of the micro-cell adjacent to the current macro-cell from the network side.

It can be seen that, the current position information is obtained when the UE is in a service connection state, and the network side is notified to transfer the information of the micro-cell adjacent to the current macro-cell when it is determined that the UE is in the coverage threshold range of the micro-cell adjacent to the current macro-cell according to the current position information. In this way, the information of the micro-cell which is adjacent to the macro-cell where the UE locates and covers the position of the UE may be transferred accurately to the UE, and accurate instruction given by the network for the handover of the UE between the macro-cell and the micro-cell is achieved, thus the success ratio of the handover of the UE between the macro-cell and the micro-cell is improved, a fast and efficient handover is ensured, and the quality of service for the user is improved.

The UE further includes an authentication information sending unit 32 and an authentication information receiving unit 33.

The authentication information sending unit 32 is configured to send a message to the network side to detect whether the UE itself has authorization for accessing a micro-cell adjacent to the current macro-cell when the service state detecting unit 31 detects that the UE itself is in a service connection state.

The authentication information receiving unit 33 is configured to receive a response message from the network side, and trigger the locating unit 34 to locate the UE itself if the information carried by the response message indicates that the UE itself has authorization for accessing the micro-cell adjacent to the current macro-cell.

The dashed box 30 in FIG. 3 represents that the authentication information sending unit 32 and the authentication information receiving unit 33 are optional.

It can be seen that the UE locates the position information of itself when the UE is in a service connection state and has authorization for accessing the micro-cell adjacent to the current macro-cell. The UE notifies the network side to transfer the information of the micro-cell which the UE has authorization for accessing and which is adjacent to the current macro-cell when it is determined that the UE is in the coverage threshold range of the micro-cell which the UE has authorization for accessing and which is adjacent to the current macro-cell according to the position information. In this way, the network side can transfer accurately the information of the micro-cell which the UE has authorization for accessing and which is adjacent to the macro-cell where the UE locates and covers the position of the UE to the UE, and accurate instruction given by the network for the handover of the UE between the macro-cell and the micro-cell is achieved Thus the success ratio of the handover of the UE between the macro-cell and the micro-cell is improved, a fast and efficient handover is ensured, and the quality of service for the user is improved.

Figure 4:
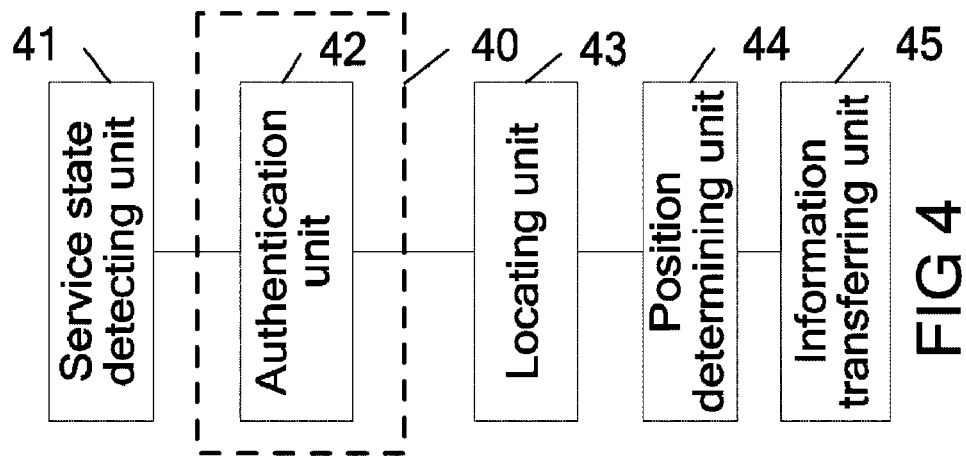
FIG. 4 is a schematic structural view of a network equipment according to an embodiment of the present invention.

Referring to FIG. 4, a schematic structural view of an embodiment of a network equipment according to an embodiment of the present invention is shown, and the network equipment includes a service state detecting unit 41, a locating unit 43, a position determining unit 44, and an information transferring unit 45.

The service state detecting unit 41 is configured to detect whether a UE is in a service connection state.

The locating unit 43 is configured to locate the position information of the UE.

The obtaining, by the locating unit 43, the current position information of the UE may be implemented in many ways, for example, when the UE supports GPS, the UE may be instructed by the locating unit to locate. The AFLT technology may also be employed to acquire the current position information of the UE, and the fundamental principle of AFLT technology is as follows. A UE measures the pilot signals of three or more different cells, and acquires the arriving points of the pilot signals of different cells. Thereafter, at the locating unit 43, a PDE calculates the current position of the UE employing a suitable position calculating method according to the measurement result and in combination with the position data of corresponding cells provided by an MPE. Of course, other locating methods such as satellite positioning or network properties intelligent searching and matching may also be employed.

The position determining unit 44 is configured to determine whether the UE is in a coverage threshold range of a micro-cell adjacent to a current macro-cell according to the position information of the UE located by the locating unit 43.

The determining, by the position determining unit, whether the UE is in the coverage threshold range of the micro-cell adjacent to the current macro-cell according to the current position information obtained by the locating unit 43 may be implemented specifically by determining whether a distance between the current position of the UE and the micro-cell is smaller than or equal to a pre-set coverage distance threshold of the micro-cell, or may be implemented by determining whether the fading for the distance between the current position of the UE and the micro-cell is smaller than or equal to a maximum link coverage threshold of the micro-cell.

The information transferring unit 45 is configured to transfer the information of the micro-cell adjacent to the current macro-cell to the UE when the UE is in the coverage threshold range of the micro-cell adjacent to the current macro-cell.

The information transferring unit 45 adds the information of the micro-cell adjacent to the current macro-cell to a list of neighboring cells, and sends the list of neighboring cells to the UE. There may be several specific sending modes, for example, defining a dedicated message to be transferred to the UE, sending by broadcast, or a mode of combining unicast with broadcast. The broadcast way is sending a single message to a set of UEs, and the unicast way is sending a single message to one UE. When there are simultaneously two or more UEs having access authorization in a service connection state within a micro-cell and in the coverage threshold range of the micro-cell, the information of the micro-cell may be transferred to the UEs through broadcasting. When there is only one UE having access authorization in a service connection state within a micro-cell and in the coverage threshold range of the micro-cell at a certain moment or a relatively short time period, the information of the micro-cell may be transferred to the UE through unicast.

A method of combining event-based sending and periodic sending may also be employed. The event-based sending refers to sending whenever meeting a certain condition, and the periodic sending refers to sending once at regular intervals. There are many modes of combining the event-based sending and the periodic sending. For example, in a modes of "and", send when a preset condition is met, and send when a preset sending period expires, where sending when a preset condition is met and sending when a preset sending period expires do not conflict with each other. In a mode of "or", within a period of guard time, send when a preset condition is met, and not send when a sending period expires within the period of time; and when the period of the guard time passes, send if the sending period expires.

Which sending mode is used may be determined according to the current resources and the supported modes of the system.

It can be seen that the position information of a UE is obtained when the network side detects that there is a UE in a service connection state in current macro-cell, and the information of the micro-cell adjacent to the current macro-cell is transferred to the UE when it is determined that the UE is in the coverage threshold range of the micro-cell adjacent to the current macro-cell according to the position information. In this way, the information of the micro-cell which the UE has authorization for accessing and which is adjacent to the macro-cell where the UE locates and covers the position of the UE may be transferred accurately to the UE, and accurate instruction given by the network for the handover of the UE between the macro-cell and the micro-cell is achieved. Thus the success ratio of the handover of the UE between the macro-cell and the micro-cell is improved, a fast and efficient handover is ensured, and the quality of service for the user is improved.

The network equipment further includes an authentication unit 42. The authentication unit 42 is configured to detect whether the UE in a service connection state has authorization for accessing a certain micro-cell adjacent to the current macro-cell, and trigger the locating unit 43 to locate the UE when the UE has authorization for accessing a certain micro-cell adjacent to the current macro-cell.

It can be seen that the network equipment locates the position information of itself when it is detected that the UE is in a service connection state and has authorization for accessing the micro-cell adjacent to the current macro-cell, and transfers the information of the micro-cell which the UE has authorization for accessing and which is adjacent to the current macro-cell when it is determined that the UE is in the coverage threshold range of the micro-cell which the UE has authorization for accessing and which is adjacent to the current macro-cell according to the position information. In this way, the information of the micro-cell which the UE has authorization for accessing and which is adjacent to the macro-cell where the UE locates and covers the position of the UE can be transferred accurately to the UE, and accurate instruction given by the network for the handover of the UE between the macro-cell and the micro-cell is achieved. Thus the success ratio of the handover of the UE between the macro-cell and the micro-cell is improved, a fast and efficient handover is ensured, and the quality of service for the user is improved.

The dashed box 40 in FIG. 4 represents that the authentication unit 42 is optional.

Figure 5:
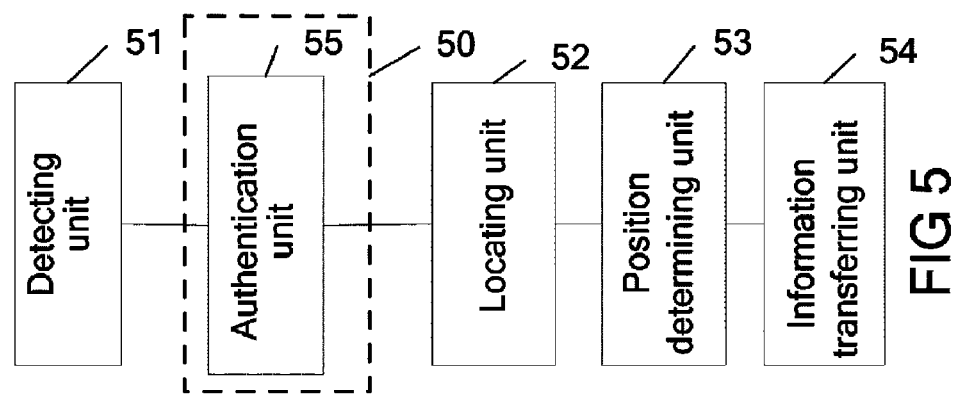
FIG. 5 is a schematic structural view of another network equipment according to an embodiment of the present invention.

Referring to FIG. 5, a schematic structural view of another embodiment of the network equipment according to an embodiment of the present invention is shown. The equipment includes a detecting unit 51, a locating unit 52, a position determining unit 53, and an information transferring unit 54.

The detecting unit 51 is configured to detect whether a UE in a service connection state exists in a macro-cell adjacent to a current micro-cell.

The locating unit 52 is configured to locate the position information of the UE in a service connection state when a UE in a service connection state exists in the macro-cell adjacent to the current micro-cell.

In specific implementations, there are a number of locating modes with which the locating unit acquires the current position information of the UE, which can be selected according to current resources and supported modes. For example, when the UE supports GPS, then the UE may be notified to locate. The AFLT technology may also be employed to acquire the current position information of the UE, and the fundamental principle of the AFLT technology is as follows. A UE measures the pilot signals of three or more different cells, acquires the arriving points of the pilot signals of different cells, Thereafter, a PDE calculates the current position of the UE employing a suitable position calculating method according to the measurement result and in combination with the position data of corresponding cells provided by an MPE, and returns the current position of the UE to the locating unit 52 as a feedback. Of course, other locating methods such as satellite positioning or network properties intelligent searching and matching may also be employed.

The position determining unit 53 is configured to determine whether the UE is in a coverage range of a current micro-cell according to the position information of the UE obtained by the locating unit 52.

There are also a number of ways for the position determining unit 53 to determine whether the UE is in the coverage range of the current micro-cell according to the position information obtained by the locating unit 52, for example, by determining whether a distance between the current position of the UE and the current micro-cell is smaller than or equal to a predicted coverage distance threshold of the micro-cell, or by determining whether the fading between the current position of the UE and the current micro-cell is smaller than or equal to a maximum link coverage threshold of the micro-cell.

The information transferring unit 54 is configured to transfer the information of the current micro-cell to the UE when the UE is in the coverage range of the current micro-cell.

It can be seen that the position information of a UE is obtained when the network side detects that a UE in a service connection state exists in a macro-cell adjacent to the current micro-cell, and the information of the current micro-cell is transferred to the UE when it is determined that the UE is in the coverage threshold range of the current micro-cell according to the position information. In this way, the information of the micro-cell which the UE has authorization for accessing and which is adjacent to the macro-cell where the UE locates and covers the position of the UE may be transferred accurately to the UE, and accurate instruction given by the network for the handover of the UE between the macro-cell and the micro-cell is achieved. Thus the success ratio of the handover of the UE between the macro-cell and the micro-cell is improved, a fast and efficient handover is ensured, and the quality of service for the user is improved.

The network equipment further includes an authentication unit 55. The authentication unit 55 is configured to detect whether the UE in a service connection state has authorization for accessing a current micro-cell, and trigger the locating unit 52 to locate the UE when the UE has authorization for accessing the current micro-cell.

It can be seen that the network equipment detects that whether there is a UE in a service connection state exists in a neighboring macro-cell and has authorization for accessing the current micro-cell, and obtains the current position information of the UE when the result of detection is yes, and transfers the information of the current micro-cell to the UE when it is determined that the UE is in the coverage threshold range of the current micro-cell according to the current position information of the UE. In this way, a precise selection made by the network in terms of the handover of the UE between the macro-cell and the micro-cell can be achieved, thus a fast and efficient handover is ensured, the success ratio of the handover is improved, and the quality of service for the UE is improved. Meanwhile, a precise one-to-one selection made by the network in terms of the handover of the UE between the macro-cell and the micro-cell can be achieved, so the unnecessary interference to other micro-cells and UEs in the network can also be reduced, thus unnecessary resource waste of the UE is reduced, and the quality of service for the user is improved.

The dashed box 50 in FIG. 5 represents that the authentication unit 55 is optional.

Those of ordinary skills in the art may appreciate that all or partial steps of the method for implementing the embodiments described above may be accomplished by relevant hardware instructed by a program, which may be stored in a computer readable storage media, and when executed, the program includes the following steps.

The position information of a UE is obtained when detecting that the UE is in a service connection state.

If determining that the UE is in the coverage threshold range of a micro-cell adjacent to a current macro-cell according to the position information of the UE, the information of the micro-cell is transferred to the UE.

The above storage medium may be a read-only memory (ROM), a magnetic disk, or an optical disk.

The method and equipment for transferring information of a neighboring cell in a wireless communications system provided by the embodiments of the present invention are described in detail above. For those of ordinary skill in the art, changes may be made to the detailed description and the application scope according to the ideas of the present invention. To sum up, the content of the specification should not be understood as limiting to the present invention.

What is claimed is:

1. A method for transferring information of a neighboring cell in a wireless communications system, comprising:
    obtaining position information of a user equipment (UE) when detecting that the UE is in a service connection state;
    determining whether the UE is in a coverage threshold range of a micro-cell adjacent to a current macro-cell according to the position information of the UE; and
    transferring information of the micro-cell to the UE when the UE is in the coverage threshold range of the micro-cell adjacent to a current macro-cell.

2. The method according to claim 1, wherein, the obtaining the position information of the UE comprises obtaining the position information of the UE through a global positioning system (GPS).

3. The method according to claim 1, wherein, the detecting that the UE is in the service connection state comprises detecting, by a network side, whether the UE is in a connection state.

4. The method according to claim 1, wherein the determining that the UE is in the coverage threshold range of the micro-cell adjacent to the current macro-cell according to the position information of the UE comprises:
    detecting whether a distance between the current position of the UE and the micro-cell is smaller than or equal to a pre-set coverage distance threshold of the micro-cell.

5. The method according to claim 4, wherein before the obtaining the position information of the UE, the method further comprises:
    determining whether the UE has authorization for accessing the micro-cell adjacent to the current macro-cell; and
    obtaining the position information of the UE, when the UE has authorization for accessing the micro-cell adjacent to the current macro-cell.

6. The method according to claim 1, wherein the determining whether the UE is in the coverage threshold range of the micro-cell adjacent to a current macro-cell according to the position information of the UE comprises:
    determining whether fading for a distance between the current position of the UE and the micro-cell is smaller than or equal to a maximum link coverage threshold of the micro-cell.

7. The method according to claim 6, wherein before the obtaining the position information of the UE, the method further comprises:
    determining whether the UE has authorization for accessing the micro-cell adjacent to the current macro-cell; and
    obtaining the position information of the UE, when the UE has authorization for accessing the micro-cell adjacent to the current macro-cell.

8. The method according to claim 1, wherein
    before the transferring information of the micro-cell to the UE, the method further comprises adding, by the network side, the information of the micro-cell to a list of neighboring cells; and
    the transferring the information of the micro-cell to the UE comprises sending, by the network side, the list of neighboring cells to the UE.

9. The method according to claim 1, wherein the transferring the information of the micro-cell to the UE comprises transferring, by the network side, the information of the micro-cell through broadcasting.

10. The method according to claim 1, wherein before the obtaining the position information of the UE, the method further comprises:
    determining whether the UE has authorization for accessing the micro-cell adjacent to the current macro-cell; and
    when the UE has authorization for accessing the micro-cell adjacent to the current macro-cell, obtaining the position information of the UE.

11. The method according to claim 1, wherein, the obtaining the position information of the UE comprises obtaining the position information of the UE by employing advanced forward link trilateration (AFLT).

12. The method according to claim 1, wherein, the obtaining the position information of the UE comprises obtaining the position information of the UE through satellite positioning.

13. The method according to claim 1, wherein, the obtaining the position information of the UE comprises obtaining the position information of the UE through network properties intelligent searching and matching positioning.

14. The method according to claim 1, wherein, the detecting that the UE is in the service connection state comprises detecting, by the network side, whether the UE is in a connection state after receiving a request message from the UE.

15. The method according to claim 1, wherein the transferring the information of the micro-cell to the UE comprises transferring, by the network side, the information of the micro-cell through unicast.

16. The method according to claim 1, wherein the transferring the information of the micro-cell to the UE comprises transferring, by the network side, the information of the micro-cell through a dedicated message.

17. The method according to claim 1, wherein the transferring the information of the micro-cell to the UE comprises transferring, by the network side, the information of the micro-cell through periodic transmission.

18. An apparatus for transferring information of a neighboring cell in a wireless communications system, the equipment comprising:
hardware coupled to a memory,
wherein the hardware is programmed to transfer information by:
  obtaining position information of a user equipment (UE) when detecting that the UE is in a service connection state;
  determining whether the UE is in a coverage threshold range of a micro-cell adjacent to a current macro-cell according to the position information of the UE; and
  transferring information of the micro-cell to the UE when the UE is in the coverage threshold range of the micro-cell adjacent to a current macro-cell.

* * * * *